(12) United States Patent
Huang et al.

(10) Patent No.: US 7,821,145 B2
(45) Date of Patent: Oct. 26, 2010

(54) AIRCRAFT ENGINE STARTER/GENERATOR AND CONTROLLER

(75) Inventors: Hao Huang, Troy, OH (US); David Karipides, Casstown, OH (US); Mohamed Abbas, Dayton, OH (US); David Tsui, Centerville, OH (US)

(73) Assignee: Smiths Aerospace, LLC, Grand Rapids, MI (US)

( * ) Notice: Subject to any disclaimer, the term of this patent is extended or adjusted under 35 U.S.C. 154(b) by 0 days.

(21) Appl. No.: 12/404,504

(22) Filed: Mar. 16, 2009

(65) Prior Publication Data

US 2009/0174188 A1    Jul. 9, 2009

Related U.S. Application Data

(62) Division of application No. 11/452,236, filed on Jun. 14, 2006, now Pat. No. 7,508,086.

(51) Int. Cl.
*F02D 25/00* (2006.01)
*F02N 11/00* (2006.01)
*H02P 11/00* (2006.01)

(52) U.S. Cl. .............. 290/31; 290/4 A; 290/38 R; 290/40 F; 322/17

(58) Field of Classification Search .............. 290/31, 290/32, 34, 36 R, 38 R, 40 C, 40 F, 4 A; 322/17
See application file for complete search history.

(56) References Cited

U.S. PATENT DOCUMENTS

| | | | |
|---|---|---|---|
| 4,481,459 A | 11/1984 | Mehl et al. | |
| 4,743,777 A | 5/1988 | Shilling et al. | |
| 4,967,096 A | 10/1990 | Diemer et al. | |
| 5,013,929 A | 5/1991 | Dhyanchand | |
| 5,015,941 A | 5/1991 | Dhyanchand | |
| 5,023,537 A | 6/1991 | Baits | |
| 5,055,700 A | 10/1991 | Dhyanchand | |
| 5,068,590 A | 11/1991 | Glennon et al. | |
| 5,097,195 A | 3/1992 | Raad et al. | |
| 5,387,859 A | 2/1995 | Murugan et al. | |
| 5,587,647 A * | 12/1996 | Bansal et al. | 322/45 |
| 5,920,162 A * | 7/1999 | Hanson et al. | 318/400.04 |
| 6,351,090 B1 | 2/2002 | Boyer et al. | |
| 6,720,753 B2 * | 4/2004 | Kikuchi et al. | 322/17 |
| 6,737,836 B2 * | 5/2004 | Namai | 322/44 |
| 6,838,779 B1 | 1/2005 | Kandil et al. | |
| 7,078,826 B2 | 7/2006 | Xu et al. | |
| 7,105,944 B2 * | 9/2006 | Wakitani et al. | 307/10.6 |
| 7,301,311 B2 | 11/2007 | Xu et al. | |
| 7,508,086 B2 | 3/2009 | Huang et al. | |
| 2004/0021447 A1* | 2/2004 | Kalman et al. | 322/24 |
| 2006/0087123 A1* | 4/2006 | Stout et al. | 290/2 |
| 2007/0296215 A1* | 12/2007 | Dooley | 290/28 |

* cited by examiner

*Primary Examiner*—Julio Cesar Gonzalez
(74) *Attorney, Agent, or Firm*—William Scott Andes, Esq.; Armstrong Teasdale LLP (57) ABSTRACT

An aircraft starting and generating system includes a starter/generator that includes a main machine, an exciter, and a permanent magnet generator. The system also includes an inverter/converter/controller that is connected to the starter/generator and that generates AC power to drive the starter/generator in a start mode for starting a prime mover of the aircraft, and that converts AC power, obtained from the starter/generator after the prime mover have been started, to DC power in a generate mode of the starter/generator. The exciter includes a stator and a rotor, and wherein the exciter rotor includes a three-phase AC winding.

9 Claims, 8 Drawing Sheets

AIRCRAFT ENGINE STARTER/GENERATOR AND CONTROLLER

CROSS-REFERENCE TO RELATED APPLICATIONS

This application is a divisional patent application and claims priority to U.S. patent application Ser. No. 11/452,236, filed Jun. 14, 2006 now U.S. Pat. No. 7,508,086 for "AIRCRAFT ENGINE STARTER/GENERATOR AND CONTROLLER," which is hereby incorporated by reference herein in its entirety.

FIELD OF THE INVENTION

The invention relates generally to a combination of a bidirectional energy conversion brushless electric rotating device that converts electrical energy to mechanical energy in start mode and mechanical energy to electrical energy in generate mode. In particular, the invention relates to a high power density aircraft engine starting and power generating system, that includes a three electric machine set, a Starter/Generator (S/G), and an IGBT based and digitally controlled device, referred to herein as an Inverter/Converter/Controller (ICC). Furthermore, the invention relates to elimination of the rotor-position sensor of a wound field synchronous machine based S/G, resulting in a sensorless-controlled S/G and ICC system.

DESCRIPTION OF THE RELATED ART

There currently exist starter generator systems for aircraft, which are used to both start an aircraft engine, and to utilize the aircraft engine after it has started in a generate mode, to thereby provide electrical energy to power systems on the aircraft. For example, U.S. Pat. No. 4,743,777, issued to William Shilling et al., describes a starter generator system with two stator exciter windings, and which includes a variable voltage, variable frequency power converter that is alternately connected to drive an dynamoelectric machine as a starting motor or to receive power from the machine during generator operation. U.S. Pat. No. 5,587,647, issued to Madan Bansal et al., describes a dual output, synchronous-induction starting/generating system. The Bansal system includes a synchronous generator and an induction motor/generator mutually coupled to a shaft that is driven to an external prime mover, such as an aircraft engine. The Bansal system also includes a rectifier/inverter that allows bi-directional power flow to effectuate both power generation as well as electric start of the aircraft engine.

While the prior art systems described above are useful in starting an aircraft engine and in generating power from the aircraft engine once the engine has started, it is desirable to come up with a system that has at least one of a higher power density, a higher efficiency, and a higher dynamic performance, in either or both a start mode and a generate mode.

SUMMARY OF THE INVENTION

According to at least one aspect of the invention, there is an aircraft engine starter/generator system that includes a Starter/Generator (S/G), and an Inverter/Converter/Control (ICC), with higher power density, higher efficiency, and higher dynamic performance in both start mode and generate mode, as compared to the conventional systems in the field.

The S/G includes three electric machines: a main machine, an exciter, and a Permanent Magnet Generator (PMG). The ICC, which can be an IGBT based inverter/converter/controller and which is a digitally controlled, bidirectional electronic device, is connected to the input/output of the stator winding of the main machine of the S/G. The electronic device generates AC power to drive the S/G in start mode and converts the AC power to the DC power requested on the aircraft in generate mode.

A first embodiment includes at least two aspects of a S/G system that result in lighter weight and superior performance of the overall system. The first aspect is a dual functional exciter stator that contains a winding working conjunctionally with a contactor located in the ICC. During start mode, the winding is configured into an AC three phase winding by the contactor, and during generate mode, the winding is configured into a single DC winding by the same contactor. Without adding any appreciable size and weight on the machine, the dual AD and DC functional winding satisfying the needs for start mode and generate mode respectively. The second aspect is the elimination of the conventional mechanical position sensor for commutation of the power electronic switches in both start mode and generator mode. This achieves noticeable size and weight reduction of the S/G.

A second embodiment is directed to the start mode of the S/G system, and includes five aspects that act to achieve better torque density of the S/G in start mode, as compared to the conventional approaches in the field. The first aspect is the three phase AC winding of the exciter stator configured and controlled in the braking mode of the induction machine. Realization of a zero speed sensorless approach corresponds to the second aspect related of this embodiment. The third aspect is an auto-field weakening mechanism developed to keep the inverter well within the Pulse Width Modulation (PWM) region and retain effective current regulations throughout the entire speed range in start mode. The fourth aspect is the combining of auto-field weakening with a near unity power factor control scheme, in order to accomplish higher power density at high speed while the inverter voltage is saturated. The fifth aspect is a vector control scheme in conjunction with a negative d-axis current profile that oppositely aligns to the field current of the main machine to generate maximum reluctance torque to overcome the torque limitation caused by the magnetic saturation. The approach increases the torque density of the S/G as compared to conventional systems.

A third embodiment is directed to the generate mode of the S/G system, and includes four aspects. The first aspect is related to the inactive and active rectification configurability. Controlled by the exciter converter digital control assembly 240 and the main converter digital control assembly 230, the main IGBT/Diode Bridge can become an inactive rectifier or an active rectifier, depending upon the application. The second aspect is directed to a control of the IGBT converter that combines auto-field modification and over-modulation to achieve optimum efficiency of the IGBT generate mode operation. The third aspect is the providing of an IGBT commutation approach during generate mode. The IGBTs' commutation is based on a voltage mode sensorless, which is a similar sensorless approach used in start mode. The fourth aspect is directed to accomplishing regeneration in absorbing excessive energy on the DC bus into the machine while regulating the bus voltage simultaneously.

BRIEF DESCRIPTION OF THE DRAWINGS

The foregoing advantages and features of the invention will become apparent upon reference to the following detailed description and the accompanying drawings, of which.

DETAILED DESCRIPTION OF SPECIFIC EMBODIMENTS

The present invention will be described in detail below, with reference to the accompanying drawings. The present invention relates to a bidirectional energy conversion, brushless, electric rotating device that converts electrical energy to mechanical energy in start mode and mechanical energy to electrical energy in generate mode.

The first embodiment of the present invention will be described next, with respect to overall construction of the S/G and ICC engine starting and power generating system. The first embodiment includes at least two aspects, to be described in detail below.

Figure 1:
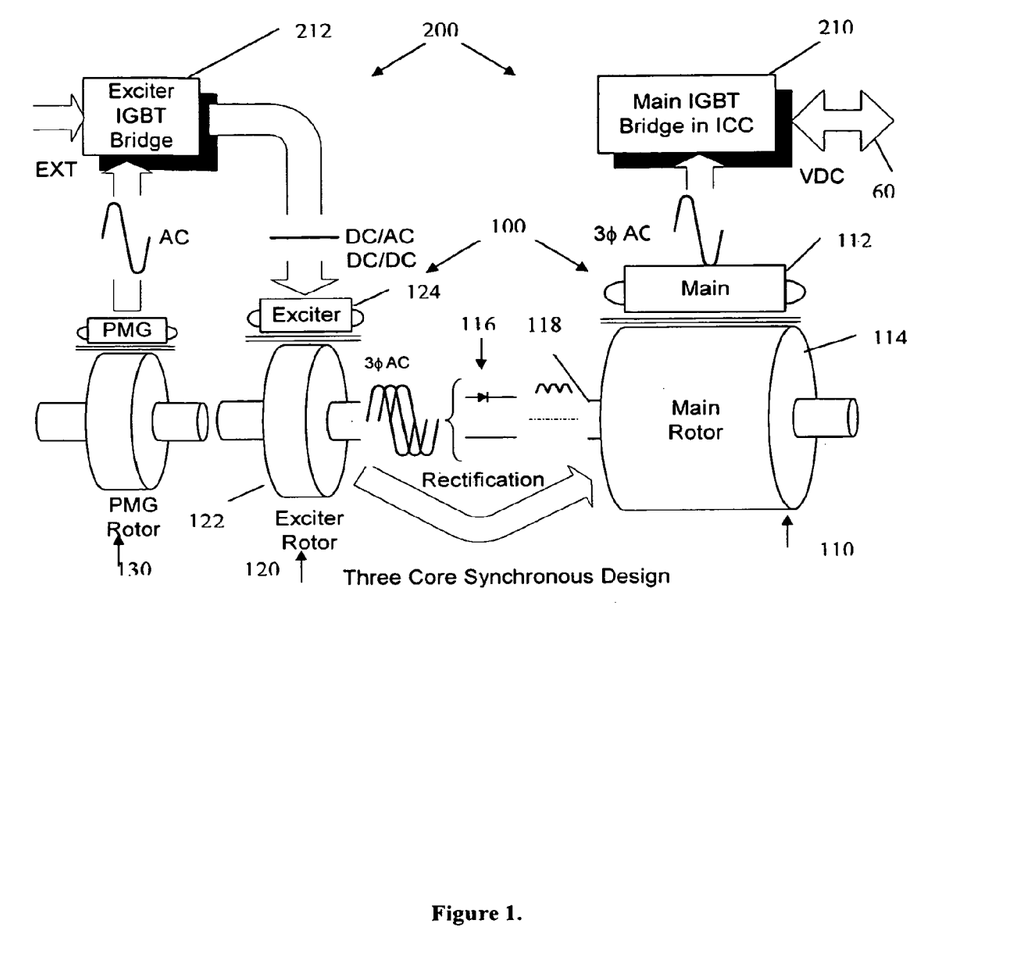
FIG. 1 is an illustrative diagram of the overall S/G and ICC engine starting and power generating system of the invention.
Figure 2:
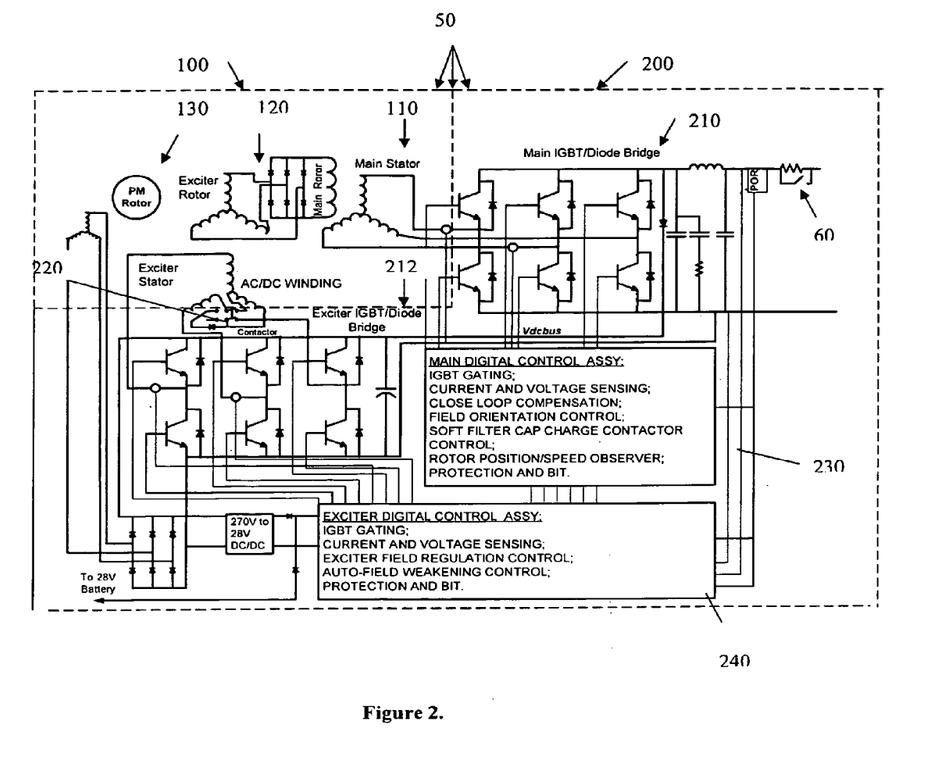
FIG. 2 is a block diagram of the overall S/G and ICC engine starting and power generating system of the invention.
Figure 5:
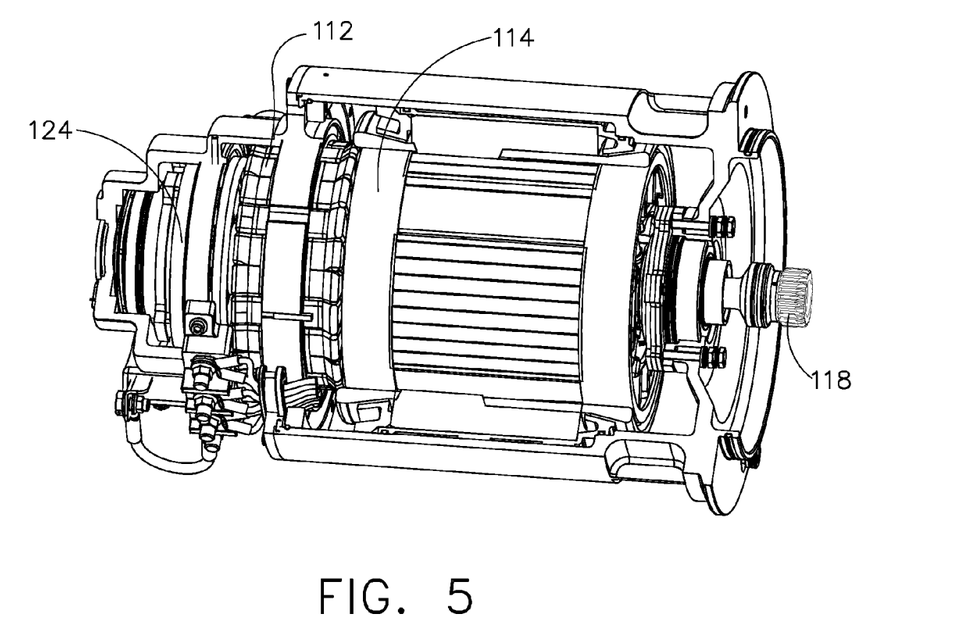
FIG. 5 is a section view of the S/G of the invention.

The S/G and ICC engine starting and power generating system 50 of the first embodiment includes an S/G 100 and an ICC 200. As illustrated in FIG. 1, FIG. 2 and FIG. 5, the S/G 100 is a combination of three electric machines, which are a main machine 110, an exciter 120, and a PMG 130. This arrangement is called a three-machine set. The main machine 110 may be a salient synchronous machine in one possible implementation of the first embodiment. The stator 112 of the main machine 110 connects to the main IGBT/Diode Bridge 210 of the ICC 200. The rotor 114 of the main machine 110 connects to the output of a full wave or half wave-rotating rectifier 116 located inside the shaft 118 of the main rotor 114. The exciter rotor 122 has a three-phase winding that connects to the input of the rotating rectifier 116, and the exciter stator 124 includes a DC winding and a three-phase AC winding that connects to an exciter IGBT/Diode bridge 212 of the ICC 200 through a contactor 220 that is shown in FIG. 2, whereby FIG. 2 provides a block diagram of the S/G and ICC system 50, with emphasis on the components making up the main IGBT/Diode bridge 210 and the exciter IGBT/Diode bridge 212.

The ICC 200 shown in FIG. 2 includes two IGBT/Diode bridges: the main bridge 210 and the exciter bridge 212. The main bridge 210 and the exciter bridge 212 are also referred to as a main inverter/converter and an exciter inverter/converter, respectively. Each is controlled by a digital control assembly. The assembly that controls the main IGBT/Diode Bridge 210 is called the main digital control assembly 230. Alternatively, it is also called the starter inverter digital control assembly in start mode and it is called the generator converter control assembly in generate mode. The assembly that controls the exciter IGBT/Diode Bridge 212 is called the exciter digital control assembly 240. Alternatively, it is also called the exciter inverter digital control assembly in start mode and the exciter converter digital control assembly in generate mode.

The main digital control assembly 230, along with its embedded software, controls the main bridge 210 that generates AC power to drive the S/G in start mode and converts the AC power to the power of the DC power requested on the aircraft in generate mode. This highly integrated approach results in a lightweight, simple and reliable system, as compared to conventional S/G systems.

Figure 6A:
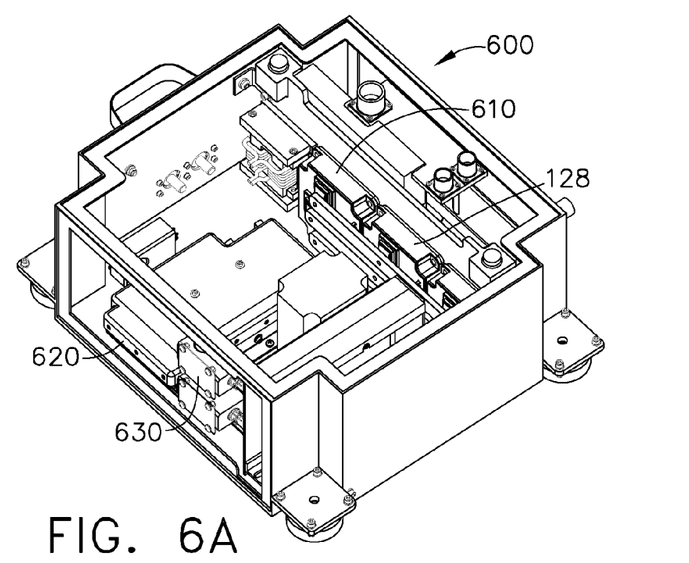
FIGS. 6A and 6B are isometric views of a housing for the ICC of the invention.
Figure 6B:
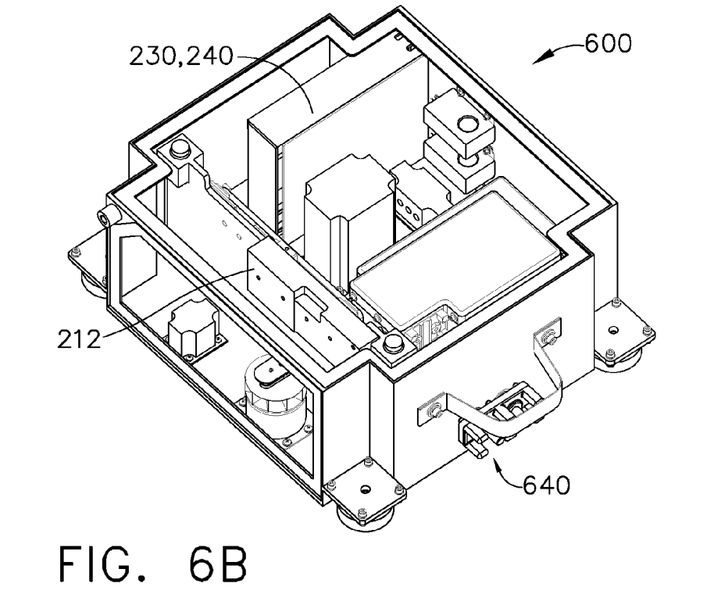

FIGS. 6A and 6B are detailed isometric views of the ICC 200 of the first embodiment, as it may be packaged in a housing 600 that can be fitted onto a cabinet within an aircraft. Within the housing 600 is a cold plate 610 (for heat dissipation and/or removal), the main IGBT/diode bridge 210, the exciter IGBT/diode bridge 212, the main and exciter digital control assemblies 230, 240, a filter cap assembly 620, sense assemblies 630, and a 270 VDC output terminal block 640 (provided on an outer surface of the housing 600, so as to provide 270 VDC power to other components within the aircraft).

The S/G and ICC engine starting and power generating system 50 has two operating modes: start mode and generate mode. In start mode, the S/G and ICC system 50 is powered from a separate power source, VDC 60, whereby the connection to the separate power source VDC 60 is shown in FIG. 1 and FIG. 2. The main machine 110 works as a three-phase wound field salient synchronous motor in start mode. Two things have to happen in order to produce torque at the shaft of the synchronous motor. The first is to input three-phase alternating currents to the three-phase winding of the main stator 112, and the second is to provide excitation current to the main rotor 114. The frequency of the currents to the main stator 112 is provided so as to be proportional to the speed of the main machine. The three phase alternating currents are provided by the main IGBT/Diode Bridge 210. The rotating field generated by the three-phase current interacts with the magnetic field generated by the main rotor 114, thus creating the mechanical torque at the shaft of the main rotor 114.

Providing an excitation current to the main rotor 114 is a challenge in conventional generating systems because of the following. At the beginning of starting, any synchronous machine based exciter generates no power. At low speed, the synchronous machine based exciter cannot generate sufficient power to power the main rotor. This is because for any synchronous based exciter, its DC excitation winding does not transfer power to the rotor winding. In fact, for conventional generating systems, the power can only be transferred from mechanical energy on the shaft. Therefore, in order to start the engine, the power that generates the main rotor excitation current must come from the exciter stator 124. In other words, the energy for the excitation during start mode crosses the air gap of the exciter 120. Obviously, a rotating transformer is desired. Conversely, in generate mode, the main machine 110 works as a three-phase wound field salient synchronous generator. To produce electricity, one thing happens, i.e., to provide excitation current to the main rotor 114. A conventional synchronous exciter can be utilized for that purpose. The different modes require different power sources for excitation. One mode needs AC three-phase currents in the exciter stator 124, and the other needs DC current in the exciter stator 124.

The first aspect of the first embodiment is a solution to the above-mentioned issue. The solution is a dual functional exciter stator working conjunctionally with the contactor 220 located in the ICC. By switching the contactor to its appropriate position, the winding in the exciter stator is configured into an AC three phase winding during start mode. In this mode, the exciter stator 124 with the AC three phase winding and the exciter rotor 122 with another AC three phase form an induction exciter. Controlled by the exciter digital control assembly 240 in the ICC, the direction of the phase sequence of the AC three phase winding is opposite from the direction of the machine shaft. Thus, the induction exciter operates in its braking mode. In generate mode, the winding in the exciter stator 124 is configured into a DC winding. The exciter stator 124 with the DC winding and the exciter rotor 122 with the AC three-phase winding form a synchronous exciter. Without adding any size and/or weight to the exciter, the configured AC and DC windings generate the necessary rotating field in the air gap between the exciter rotor 122 and exciter stator 124 during start mode and generate mode respectively. Additionally, the AC winding transfers the power from the exciter stator 124 to the exciter rotor 122 during start mode.

In both start mode and generate mode, whenever IGBTs 215 of the main IGBT/Diode bridge 210 commutate, the mechanical position information of the main rotor 114 becomes needed for the power switch commutation. Conventionally, a mechanical position sensor provides the position information. This sensor has sufficient position accuracy, mechanical integrity and thermal capability to deal with the severe environment on the aircraft. Both the optical encoder and the hall sensor cannot meet the environmental requirements of an aircraft. A resolver does meet these requirements. However, a resolver sensor, along with its mechanical supporting and packaging structure, adds considerable weight and size to the system.

The second aspect of the first embodiment of the present invention is directed to elimination of the mechanical position sensor. As shown in FIG. 2 and detailed in FIGS. 3 and 4, a sensorless rotor position signal $\theta$, $\omega_e$ (rotor position, rotor speed) is generated by the main digital control assembly 230. The rotor position signal is constructed through voltage and current signals of the S/G by the embedded software in the main digital control assembly 230. Since the sensorless approach for generate mode is a subset of start mode, the detailed description will be provided in the first embodiment related to start mode in a later portion of this application.

The second embodiment of the present invention will be described next, which corresponds to the S/G and ICC system 50 operating in start mode. There are five aspects in the second embodiment, to be described in detail below.

Figure 3:
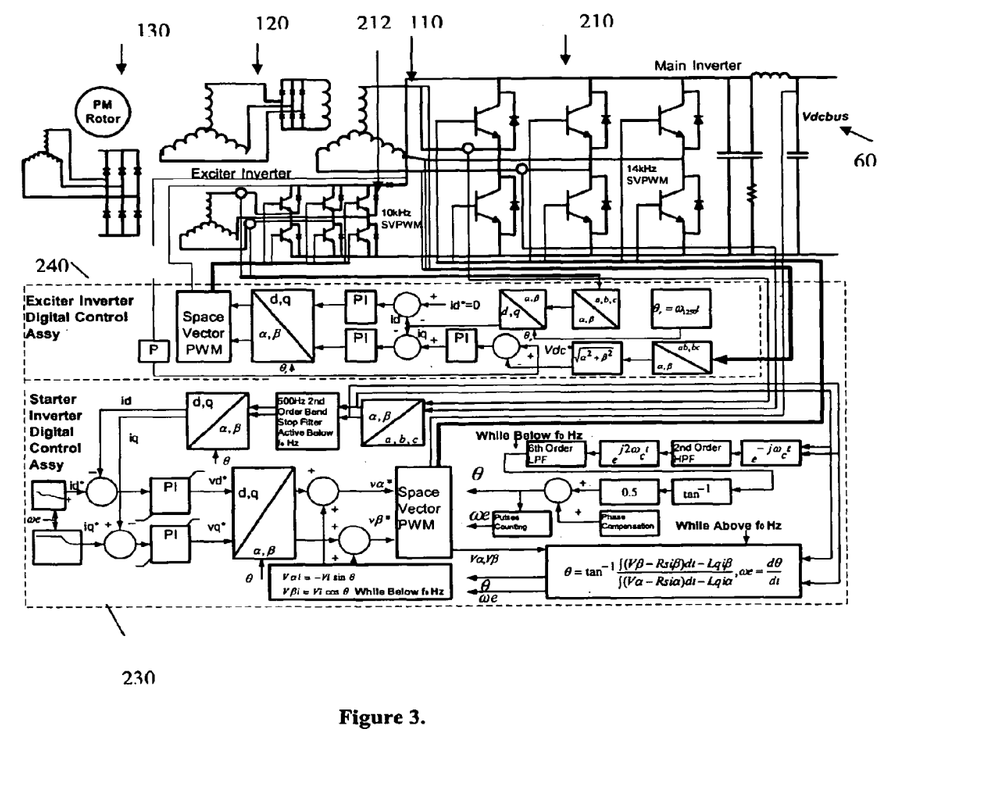
FIG. 3 is a block diagram of the S/G and ICC of the invention in start mode.

FIG. 3 presents a block diagram of the S/G and ICC system 50 in start mode. There are three electric machines—the main synchronous motor 110, the induction exciter 120, and the PMG 130. The main synchronous motor 110 and the induction exciter 120 play an important role in start mode. The main IGBT/Diode Bridge 210 receives DC input power from a DC bus (for example, 270 Vdc), and inverts the DC power to AC power. The three-phase AC currents generated by the inverter feed into the main synchronous motor 110. The gating signals to generate the AC currents are controlled by the starter inverter digital control assembly 230. The starter inverter digital control assembly 230 measures Phase a current, Phase b current, and DC bus voltage. The Phase a and b currents are transferred to $\alpha$ and $\beta$ currents in the synchronous stationary frame by using a Clarke transformation realized through the embedded software in the main digital control assembly 230. The $\alpha$ axis coincides with the a axis that is located at the center of the Phase a winding of the main stator, while the $\beta$ axis is 90 electrical degrees ahead of $\alpha$ axis in space. The $\alpha$ and $\beta$ currents are further transferred to d and q currents in the synchronous rotational frame by using a Park transformation realized through the same embedded software. The d axis is aligned with the axis of the excitation winding of the main rotor 114, while the q axis is 90 electrical degrees ahead of the d axis in space.

As shown in FIG. 3, there are two current regulation loops—d and q loops. The outputs of the d and q loops are d and q voltages that are transferred back to $\alpha$ and $\beta$ voltages by using an Inverse-Park transformation before fed into the Space Vector Pulse Width Modulation (SVPWM). In order to perform Park and Inverse-Park transformations, the main rotor position angle are determined. The $\alpha$ and $\beta$ voltages are the inputs to the SVPWM which generates the gating signals for the IGBT switches. The switching frequency can be set at 14 kHz, or to some other appropriate frequency.

As shown in FIG. 3, similar to the starter inverter digital control assembly 230, the exciter inverter digital control assembly 240 also has Clarke, Park, and Inverse-Park transformations. Also, the exciter inverter digital control assembly 240 has d and q current regulation loops. The gating signals are generated by its corresponding SVPWM. Because, as mentioned previously, the fundamental frequency of the exciter IGBT/Diode bridge 212, or the exciter inverter, is fixed at 1250 Hz or at some other appropriate frequency, and the exciter 120 has no saliency on its rotor 122 and stator 124, the rotor position information can be artificially constructed by using formula $2\pi ft$, where f=1250 Hz and t is time. This is different from the main inverter, i.e., the real time rotor position information is not needed in this case. The SVPWM switching frequency of the exciter inverter is 10 Hz in one possible implementation, whereby other appropriately chosen switching frequencies may be utilized, while remaining within the spirit and scope of the invention.

The first aspect of the second embodiment is the induction exciter. In start mode, the exciter 120 is configured as an induction machine operating in its braking mode, or alternatively described, the exciter 120 acts like a three-phase rotating transformer. The three-phase winding of the exciter stator 124 generates a rotating field that induces three-phase voltages in the exciter rotor 122. The direction of the rotating field is controlled opposite from the rotating direction of the main machine 110. Thus, the frequency of the voltage in the exciter rotor 122 increases along with the rotor speed during start mode. The DC power from an external power source is converted to three-phase 1250 Hz power (or to some other appropriate frequency) by the exciter IGBT/Diode Bridge 212. The power crosses the air gap and is transferred to the winding of the exciter rotor 122. The three-phase voltages are then rectified by the rotating rectifiers 116 inside of the rotor shaft of the main generator. The rectified voltage supplies the excitation power to the rotor 114 of the main machine 110. Once the rotor speed reaches the engine idle speed, start mode terminates and generate mode begins. The exciter rotor 122 receives energy from both the exciter stator 124 and the rotor shaft 118. At zero speed, all the energy comes from the exciter stator 124. The energy from the shaft 118 increases along with the increase of the rotor speed.

The second aspect of the second embodiment is a sensorless implementation for constructing the main rotor position information by the digital control assembly 230 along with its embedded software. This sensorless implementation includes two parts: a) high frequency injection sensorless estimation, and b) voltage mode sensorless estimation. The high frequency injection sensorless estimation covers from 0 rpm to a predefined low speed, such as 80 rpm. The voltage mode sensorless estimation covers from the speed, such as 80 rpm, to a high rotational speed, such as 14,400 rpm, where the engine is pulled to its cut-off speed. Most other sensorless methods, including the voltage mode sensorless mentioned above, fail at zero and low speed because these methods fundamentally depend on back-EMF. The high frequency injection method does not depend upon the back-EMF.

Therefore, the method is feasible to use for the speed from 0 to a predefined low speed, such as 80 rpm. Accordingly, there is achieved rotor position estimation at rpm and at low speed of the main synchronous machine. The actual realization of the sensorless is described below.

As shown in FIG. 3, while the speed of the main machine 110 is below 80 rpm or the frequency of the main machine 110, $f_0 <= 8$ Hz, a pair of 500 Hz sine waveform voltages $V_{\alpha i}$, $V_{\beta i}$ are superimposed on the inputs of the SVPWM. This 500 Hz frequency is called the carrier frequency. Other appropriate carrier frequencies may be utilized while remaining within the spirit and scope of the invention. In FIG. 3, this carrier frequency is represented by symbol $\omega_c$. The response of the current in each phase to these two superimposed voltages contains the rotor position information.

Each phase current of the main stator has several components. As shown in FIG. 3, the Phase a and b currents are transferred to $\alpha$ and $\beta$ axes through Clarke transformation. The $\alpha$ and $\beta$ currents contain the fundamental component with frequency of $\omega_r$, the positive sequence component with frequency of $\omega_c$, the negative sequence component with frequency of $2\omega_r - \omega_c$. The positive sequence component, $\omega_c$ is useless because it does not contain any rotor position information. Accordingly, this component is removed completely. As illustrated in FIG. 3, the $\alpha$ and $\beta$ currents are rotated by $-\omega_c t$ degrees. Thus, the positive sequence component becomes a DC signal, which is then eliminated by using a $2^{nd}$ order high pass filter, or some other type of high pass filter (e.g., $1^{st}$ order, or $3^{rd}$ order or higher). The remaining components, the fundamental frequency component and negative sequence component, contain the rotor information. However, the rotor position is determined before applying the fundamental current to the machine at zero speed and also, at zero and low speed the fundamental component is very weak. The only component that can reliably extract the rotor position information is the negative sequence component. After the previous rotation, the frequency of the component is changed to $2\omega_r - 2\omega_c$. Another rotation, $2\omega_c t$, is then performed by the digital control assembly 230. The output of the rotation goes through a $6^{th}$ order low pass filter, or to some other appropriate low pass filter (e.g., $1^{st}$, 2nd, ... or $5^{th}$ order low pass filter). Using $i_{\beta 2\theta}$ to represent the remaining signal of the $\beta$ current and $i_{\alpha 2\theta}$ to represent the remaining signal of the $\alpha$ current, one obtains the following angle:

$$\theta' = 0.5 \tan^{-1}\left(\frac{i_{\beta 2\theta}}{i_{\alpha 2\theta}}\right).$$

Unfortunately, the frequency of the above angle has two times frequency of the fundamental frequency, and thus it cannot be directly used to the Park and Inverse-Park transformations. To convert the above angle to the rotor position angle, it is detected whether $\theta'$ is under a north pole to south pole region or under a south pole to north pole region. If the $\theta'$ is under the north pole to south pole region, the angle is $$\theta = \theta',$$

and if the $\theta'$ is under the south pole to north pole region, the angle is $$\theta = \theta' + \pi.$$

Figure 7:
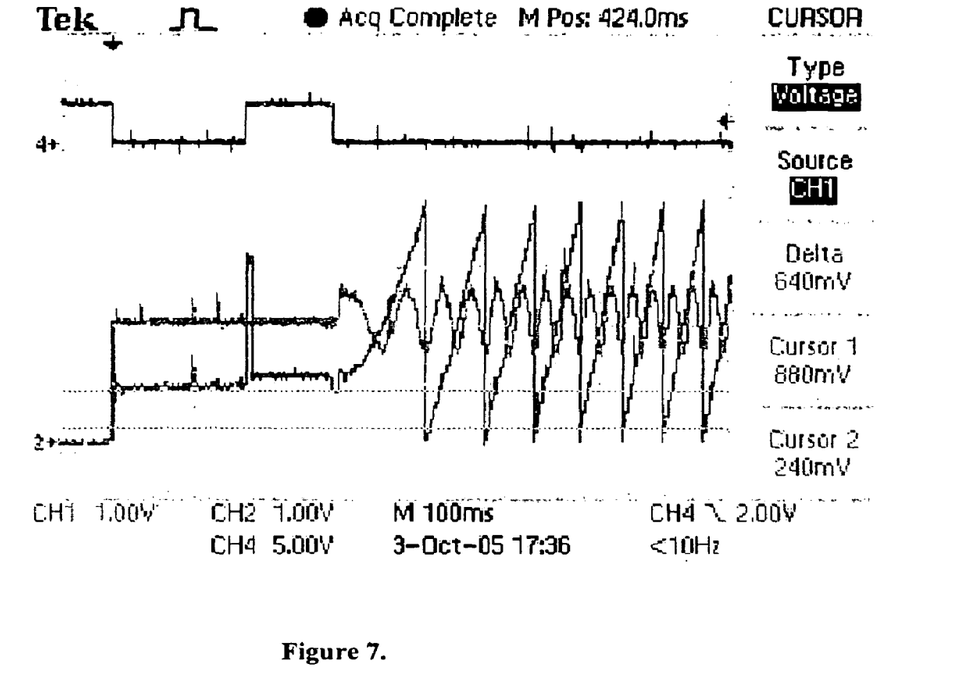
FIG. 7 is a plot of the main rotor angle estimated by the high frequency injection sensorless method.

This angle, as shown in FIG. 7, is then utilized in the Park and Inverse-Park transformations in the d and q current regulation loops. As shown in FIG. 3, a band-stop filter (500 Hz filter as shown in FIG. 3, whereby other stop band frequencies may be utilized while remaining within the spirit and scope of the invention) is placed between Clarke and Park transformations to eliminate the disturbances of the carrier frequency on the d and q current regulation loops.

This high frequency injection sensorless method works satisfactorily at zero or low speed. However, the method will not work as well with the speed with which the frequency is close to or higher than the carrier frequency. Accordingly, another sensorless method is utilized when the speed goes above a certain threshold rotational speed, such as 80 rpm. This method is the voltage mode sensorless method, as described below.

The realization of the voltage mode sensorless is accomplished by the following. Although the method has been used in an induction motor and a PM motor, it has not been applied to a salient synchronous machine because the stator self-inductances are not constants, and instead, the inductances are functions of the rotor position. The conventional $\alpha$ and $\beta$ flux linkage equations in the synchronous stationary frame, which are used to generate the rotor angle by arctangent of the $\beta$ flux linkage over the $\alpha$ axis flux linkage, are not practical to be used for a salient wound field synchronous machine because the inductances change all the time. To overcome this problem, in the second embodiment, a pair of artificial flux linkages $\lambda_\alpha'$ and $\lambda_\beta'$ as well as their expressions, are derived:

$$\begin{cases} \lambda_\alpha' = \int e_\alpha' dt = \int (v_\alpha - R_s i_\alpha) dt - L_q i_\alpha \\ \lambda_\beta' = \int e_\beta' dt = \int (v_\beta - R_s i_\beta) dt - L_q i_\beta, \end{cases}$$

where $R_s$ and $L_q$ are the main stator resistance and q axis synchronous inductance respectively. Both of the machine parameters are constant. Fortunately, $\lambda_\alpha'$ and $\lambda_\beta'$ align with the $\alpha$ and $\beta$ flux linkages, respectively, and the angle $$\theta = \tan^{-1}\left(\frac{\lambda_\beta'}{\lambda_\alpha'}\right)$$

is actually the rotor angle that can be used for Park and Inverse-Park transformations once the machine speed is above the threshold rotational speed, such as above 80 rpm. The equations can be implemented in the embedded software of the digital control assembly 230. This approach provides for reliable rotor position angle estimation while the machine speed is above a certain rotational speed, e.g., above 80 rpm.

According to the second aspect of the second embodiment, the combination of two separate methods, the high frequency inject sensorless method and the voltage mode sensorless method, provides the rotor position information with sufficient accuracy throughout the entire speed range of the synchronous machine based starter.

The third aspect of the second embodiment is directed to the voltage saturation problem of the main inverter that is appropriately dealt with. During starting, the voltage applied by the main inverter on the main machine 110 is proportional to the speed and matches the vector summation of the back-EMF and the voltage drops on the internal impedances of the main machine 110. The maximum applicable voltage by the inverter is the DC bus voltage. Once the vector summation is equal to the DC bus voltage, the inverter voltage is saturated.

Once the saturation occurs, the speed of the main machine 110 cannot go any higher, and the d and q current regulation loops will be out of control. Often, the inverter will be overcurrent and shut off. The solution provided in the second embodiment is to use an auto-field weakening approach. The main digital control assembly 230 measures the line-to-line voltages, $V_{ab}$ and $V_{bc}$ that are sent to the exciter digital control assembly 240. A Clarke transformation is applied to these two line-to-line voltages. The vector summation of the two outputs of the transformation is used as the feedback of the auto-field weakening loop, as shown in FIG. 3. The DC bus voltage is factored and used as the reference for the control loop. The auto-field weakening control loop prevents the inverter voltage from the saturation, and, thus, prevents the main inverter current regulation loops from going out of control and shutting off.

The fourth aspect of the second embodiment is the combining of auto-field weakening with a near unity power factor control scheme to accomplish higher power density at high speed while the inverter voltage is saturated. By way of example and not by way of limitation, near unity corresponds to a power factor greater than or equal to 0.9 and less than 1.0. While the auto-field weakening maintenances the air gap field, there is applied a predetermined d-axis current profile that pushes the main machine 110 to operate in a near unity power factor region. As can be seen in the following equation, because the auto-field weakening, besides the term $\omega L_{md}(i_f+i_d)$ remains consistently significant, and term $\omega L_{mq}i_d i_q$ becomes significant too. This significantly increases the power density of the S/G:

$$P = \omega L_{md}(i_f+i_d)i_q - \omega L_{mq}i_d i_q,$$

where P and $\omega$ are electromechanical power and rotor speed respectively, and $L_{md}$ and $L_{mq}$ are d and q magnetizing inductances, respectively.

The fifth aspect of the second embodiment is directed to increasing of the torque density at the speed below the base speed. As mentioned previously, in the second embodiment, there are two current regulation loops in the main inverter digital control assembly 230. One is the d axis loop and the other is the q axis loop. In general, the q loop controls the torque generation and the d loop controls the field in the air gap. This approach is also called a vector control approach. In order to achieve high torque density, the machine-to-magnetic saturation region is driven into by applying sufficient rotor excitation current $i_f$ and the torque generation current $i_q$. However, after the currents reach certain levels, no matter how the magnitudes of the currents $i_q$, $i_d$, and $i_f$ are increased, the torque remains the same because the machine is magnetically saturated. The remedy is to utilize the vector control set up of the present invention to maximize the reluctance torque of the machine. The electromechanical torque generated by the machine is:

$$T = L_{md}(i_f+i_d)i_q - L_{mq}i_d i_q,$$

where $L_{md}$ and $L_{mq}$ are d and q magnetizing inductances respectively. Once the machine is magnetically saturated, the term, $L_{md}(i_f+i_d)$ becomes a constant. Therefore, the way to generate a reluctance torque is to apply negative $i_d$ to the machine. Knowing $i_d = I \sin \delta$ and $I_q = I \cos \delta$, performing an optimization to the above equation, one arrives an optimum profile of the id current:

$$i_d = \frac{\frac{\lambda_i}{L_{mq}} - \sqrt{\left(\frac{\lambda_i}{L_{mq}}\right)^2 + 4i_q^2}}{2},$$

where $\lambda_i$ is the internal flux linkage of the machine.

An approximate 38% torque increase can achieve by applying the $i_d$ profile at the input of the vector control, based on simulations performed by the inventors. In summary, with the vector control set and appropriate $i_d$ current profile obtained, the torque density of the machine increases dramatically.

The third embodiment of the invention is described below. It is related to configuration and control of the ICC to achieve maximum efficiency of power generation, and thus is applicable to the generate mode of the S/G and ICC system 50.

Figure 4:
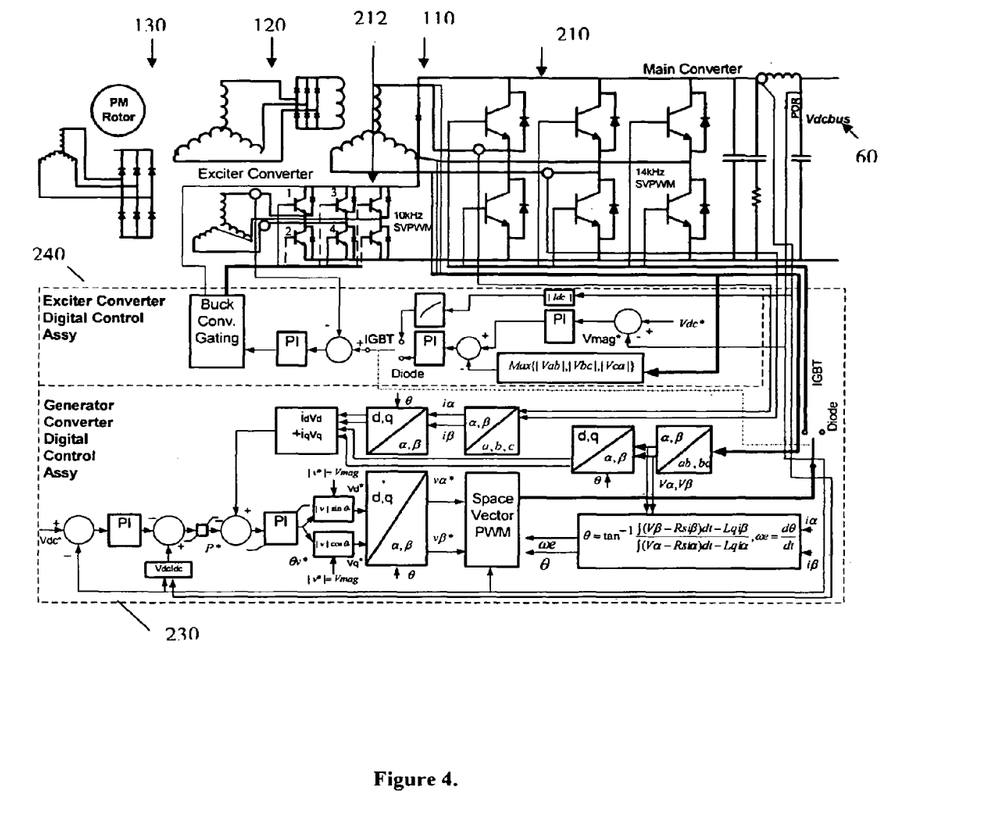
FIG. 4 is a block diagram of the S/G and ICC of the invention in generate mode.

In generate mode, as shown in FIG. 2, the main machine 110 becomes a synchronous generator and exciter 120 becomes a synchronous generator. The PMG 130 provides power to the exciter converter through a rectifier bridge as shown. The exciter converter includes two active IGBT/Diode switches in exciter IGBT/Diode bridge 212, as illustrated in FIG. 4. The IGBT/Diode switches with solid lines at their gates are the ones used for the exciter converter. These are IGBT switch number 1 and IGBT switch number 4. During generate mode, IGBT 1 is in PWM mode and IGBT 4 is on all the time. The rest of the other IGBTs are off. Number 2 diode is used for free wheeling. IGBT 1, IGBT 4 and Diode 2 plus the exciter stator winding, form a buck converter that steps down the DC bus voltage, for example, 270 Vdc, to the voltage generating the desired excitation current of the synchronous exciter.

The first aspect is related to inactive and active rectification configurability. Controlled by the exciter converter digital control assembly 240 and the main converter digital control assembly 230, the main IGBT/Diode Bridge can become an inactive rectifier or an active rectifier, depending upon the application. For an application where the power flow has only a single direction, the IGBT/Diode Bridge is configured into a diode operational bridge by the main converter digital control assembly 230. For an application where the power flow has bi-directions, the IGBT/Diode Bridge is configured into an IGBT and diode operational bridge by the same digital control assembly. When the power flow direction is from the ICC to the load, the S/G and ICC system is in generate mode. When the power flow direction is from the load to the ICC, the system is in so called regeneration mode, which is actually a motoring mode. In the inactive rectification, only the intrinsic diodes in the IGBT switches of the main inverter, also called main IGBT/Diode Bridge, are utilized. The voltage regulation is accomplished by the embedded software in the exciter digital control assembly 240, and the generator converter digital control assembly 230 keeps the IGBTs in the main inverter off, as illustrated in FIG. 4. There are three control loops controlling the voltage of POR. The most inner one is the current regulator. The measured excitation current is the feedback, and the output of the AC voltage regulator is the reference. The current regulator controls the excitation current at the commanded level. The next loop is the AC voltage loop. As shown in FIG. 4, the feedback signal is max{$|V_{ab}|$, $|V_{bc}|$, $|V_{ca}|$}. The reference is the output of the DC voltage regulator. The AC voltage loop plays an important role in keeping the DC voltage of the point-of-regulation (POR) in a desired range during load-off transients. The last control loop is the DC voltage loop. The measured voltage at the POR is compared with the reference voltage, 270 Vdc. The error goes into the compensation regulator in the corresponding digital controller. Thus, the DC voltage of the POR is regulated.

As mentioned previously, for the power generation application where the regeneration is required, the main IGBT/Diode Bridge will be configured into an active rectifier. In such a configuration, the voltage regulation is realized through the following. As illustrated in FIG. 4, both the embedded codes in the exciter digital control assembly and in the main digital control assembly are structured differently from those of the inactive rectification. Regarding the control on the exciter side, the excitation current loop becomes a PI control loop only. The reference of the control loop is generated through a look up table that is a function of the DC load current. The table is generated in such a way the current in the main stator approach to its minimum possible value. The control on the main side outer control loop is the DC voltage loop. The reference is 270 VDC; the feedback signal is the POR voltage. As shown in FIG. 4, the control loop is a PI controller with a feedforward of the DC output power added to the output of the PI controller. The DC output power is equal to the product of the DC output current and the POR voltage. The sum of the feedforward signal and the output of the PI controller is a power command that is utilized as the reference for the inner control loop, which is also a PI controller. The feedback signal is the power computed by using the voltages and currents of the generator as shown in FIG. 4. The output of the inner control loop is the voltage angle $\theta v$ which is defined in FIG. 8 and is utilized to generate the SVPWM vectors $V_d^*$ and $V_q^*$. The two vectors are the input of the Park inverse transformation. The output of the transformation is the input of the SVPWM as shown in FIG. 4.

The second aspect of the third embodiment is related to control of the IGBT converter that combines auto-field modification and over-modulation to achieve optimum efficiency of the IGBT generate mode operation.

As presented in FIG. 4, $V_d^*$ and $V_q^*$ are calculated through the following equations:

$$V_d^* = |V^*| \sin \theta_v$$

$$V_q^* = |V^*| \cos \theta_v$$

where $|V^*|$=Vmag.

To optimize the efficiency, first, Vmag is chosen to be 1 pu, thus forcing the converter into the full over-modulation region and completely dropping the IGBT switching caused by SVPWM. This minimizes the IGBT switching losses. The IGBT acts like phase shifting switching.

Figure 8:
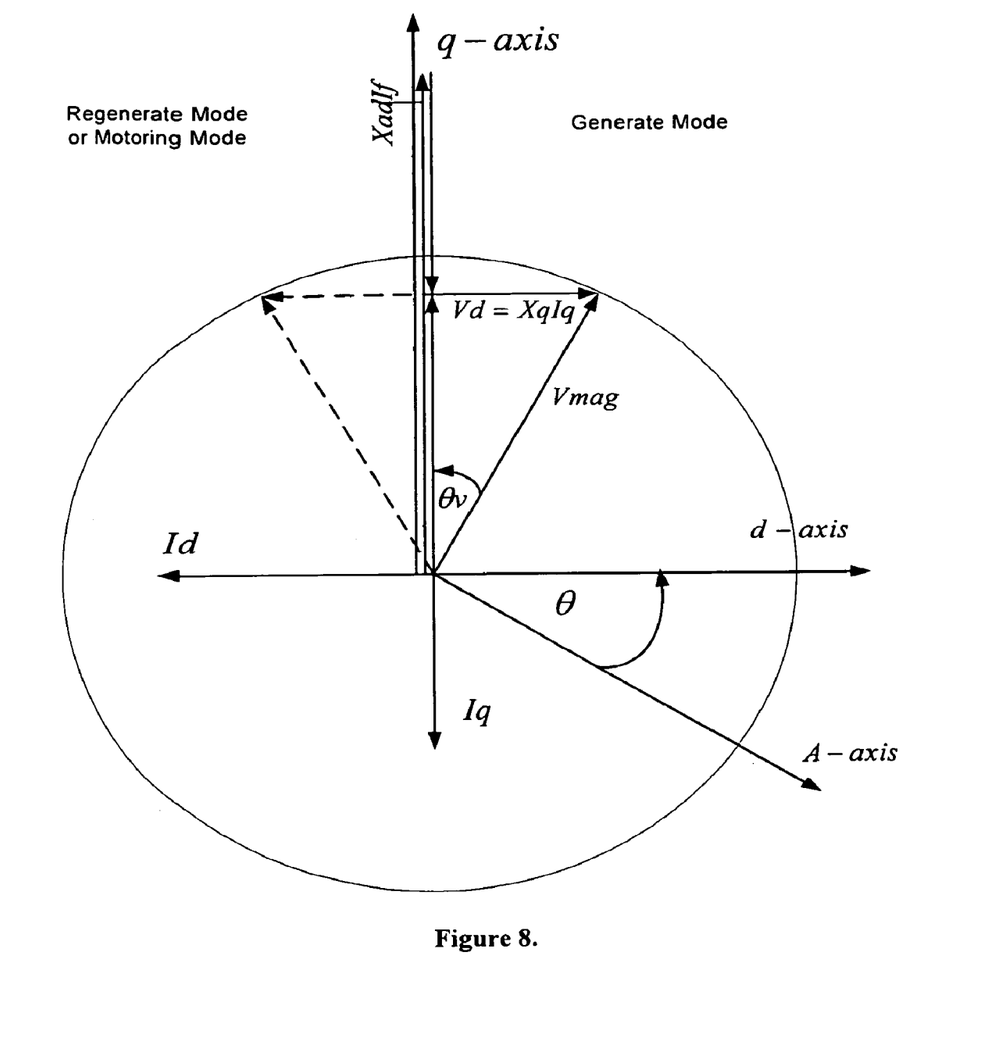
FIG. 8 is a vector diagram presenting the relationships of the vectors, of the main machine, which are controlled by the exciter and main digital control assemblies in both generate and regenerate modes.

Because Vmag is constant, the power loop regulates the power by adjusting the angle $\theta v$. When the load is zero, $\theta v$ approaches to zero, and when the load increases, $\theta v$ increases as shown in FIG. 8.

The second factor of achieving the optimized efficiency is to optimize the exciter field current so $i_d$ current is minimized. Thus, the conduction losses of the IGBTs and copper losses of the generator are minimized. It is found that the exciter field current is directly related to the DC load current. The higher DC load current is, the higher exciter field current is required. For the purpose of achieving of minimum exciter field current, a look up table is generated through measurement. The input of the look up table is the DC load current, and the output of look up table is the command of the exciter field current of the exciter stator. The table is generated in such a way that for each a DC load current point, an optimal exciter field current is found when $i_d$ current is at its minimum. Such a control method not only achieves the optimal efficiency of the S/G and ICC system, but also provides an effective approach such that the operational point can easily swing from generate mode to regenerate mode, i.e., motoring mode. Thus, sending back the excessive energy on the DC bus to the generator in a fastest manner is accomplished. The third aspect of the third embodiment is directed to providing an IGBT commutation approach during generate mode. The IGBTs' commutation is based on a sensorless voltage mode, which is a similar sensorless approach used in start mode. However, because the operating mode changes between diode only mode and IGBT mode, the rotor position angle is determined before going into the IGBT mode. $V_\alpha$ and $V_\beta$ are obtained directly from the line-to-line voltage measurement instead of from the SVPWM commands.

The fourth aspect of the third embodiment is related to accomplishing regeneration in absorbing excessive energy on the DC bus into the machine while regulating the bus voltage simultaneously. During generate mode, there can be excessive energy created by the load. Such excessive energy raises the DC bus voltage. This energy can be absorbed by the machine through the regeneration approach provided by the over-modulation SVPWM of this invention. During this situation, as illustrated in FIG. 8, the main inverter digital control reverses the direction of the voltage angle $\theta v$, and forces the main IGBT/Diode Bridge into motoring mode. Thus, the direction of the power flow will be reversed. The power will flow from the load into the machine. The over-modulation keeps the IGBTs from switching, thus, minimizes the switching losses. This aspect of the invention provides a fast way to swing the main IGBT/Diode Bridge from generate mode to regenerate mode, and vice versa.

Thus, embodiments of the present invention have been described in detail. Other embodiments of the invention will be apparent to those skilled in the art from consideration of the specification and practice of the invention disclosed herein. It is intended that the specification and examples be considered as exemplary only.

The invention claimed is:

1. An aircraft starting and generating system, comprising:
a starter/generator that includes a main machine having a rotor and a stator, an exciter having a rotor and a stator, and a permanent magnet generator having a rotor and a stator; and
an inverter/converter/controller that is connected to the starter/generator and that generates AC power to drive the starter/generator in a start mode and that converts AC power obtained from the starter/generator to DC power in a generate mode,
wherein the inverter/converter/controller includes rotor position measuring means for measuring an angular position of the respective rotors of the starter/generator based on current and voltage signals obtained from the starter/generator, the rotor position measuring means not including a mechanical position sensor, the rotor position measuring means includes high frequency injection estimation means for performing rotor position estimation when the respective rotors are rotating below a predetermined rotational speed, and voltage mode estimation means for performing rotor position estimation when the respective rotors are rotating equal to or above the predetermined rotational speed.

2. An aircraft starting and generating system, comprising:
a starter/generator that includes a main machine, an exciter, and a permanent magnet generator; and
a controller for controlling the starter/generator,
wherein the starter/generator is configured to operate as a starter in a start mode to start a prime mover of the aircraft, and to operate as a generator in a generate mode to generate power from the prime mover in order to provide power to other components of the aircraft after the prime mover has been started, wherein, in the start mode, the controller performs sensorless estimation of a rotor position of the starter in which the controller includes: a) a high frequency injection estimation unit for performing sensorless estimation of the rotor position of the starter when the starter is rotating below a predetermined speed, and b) a voltage mode sensorless estimation unit for performing sensorless estimation of the rotor position of the starter/generator when the starter is rotating above or equal to the predetermined speed.

3. The aircraft starting and generating system according to claim 2, wherein the controller comprises means for determining a phase a current and a phase b current of the starter, the determining means including a Space Vector Pulse Width Modulation (SVPWM) unit, wherein the high frequency injection estimation unit comprises:

means for superimposing a pair of sinusoidal waveforms on inputs to the Space Vector Pulse Width Modulation (SVPWM) unit; and means for determining a response of the phase a current and the phase b current to the pair of sinusoidal waveforms superimposed on the inputs of the SVPWM unit, wherein rotor position information of the starter is obtained as a result thereof.

4. The aircraft starting and generating system according to claim 3, wherein the pair of sinusoidal waveforms are orthogonal to each other and are at a same carrier frequency.

5. The aircraft starting and generating system according to claim 2, wherein the voltage mode sensorless estimation unit comprises:

means for deriving $\alpha$ and $\beta$ artificial flux linkages which are defined such that an $\alpha$ axis corresponds to a Phase a winding of a main stator of the starter/generator and a $\beta$ axis corresponds to an axis that is 90 degrees ahead of the $\alpha$ axis; and means for determining a rotating angle of the starter from the $\alpha$ and $\beta$ artificial flux linkages.

6. The aircraft starting and generating system according to claim 5, wherein the $\alpha$ and $\beta$ artificial flux linkages are defined as $\lambda\alpha'$ and $\lambda\beta'$, and wherein the rotating angle $\theta$ of the starter is determined by the following equation: $\theta=\tan^{-1}(\lambda\beta'/\lambda\alpha')$.

7. The aircraft starting and generating system according to claim 2, wherein the main machine includes an inverter, the system further comprising:

an auto-field weakening unit that includes an auto-field weakening loop, the auto-field weakening unit being configured to measure line-to-line voltages obtained from the inverter, to apply a transformation to the line-to-line voltages, to perform a vector summation of outputs of the transformation, and to feed back the vector summation as a feedback signal to the auto-field weakening loop, wherein the auto-field weakening loop is provided to the inverter in order to keep the inverter from saturating during the start mode.

8. The aircraft starting and generating system according to claim 7, further comprising:

a near unity power factor control unit configured to apply a predetermined current profile for the main machine so as to cause the main machine to operate in a near unity power factor region.

9. The aircraft starting and generating system according to claim 8, wherein the predetermined current profile is a d-axis current profile that controls a magnetic field in an air gap between a rotor of the machine and a stator of the main machine.

* * * * *